(12) United States Patent
Hammer et al.

(10) Patent No.: US 6,543,934 B1
(45) Date of Patent: Apr. 8, 2003

(54) TEMPERATURE MEASURING PROBE

(75) Inventors: Klaus Hammer, Mutterstadt (DE); Wilhelm Weber, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/101,241

(22) PCT Filed: Dec. 17, 1996

(86) PCT No.: PCT/EP96/05672

§ 371 (c)(1),
(2), (4) Date: Sep. 11, 1998

(87) PCT Pub. No.: WO97/25601

PCT Pub. Date: Jul. 17, 1997

(30) Foreign Application Priority Data

Jan. 11, 1996 (DE) .......................... 196 00 822

(51) Int. Cl.[7] ............................. G01K 1/16; G01K 1/00; H01L 35/02
(52) U.S. Cl. ....................... 374/134; 374/179; 374/208; 136/230; 136/232
(58) Field of Search ................................ 374/134, 135, 374/139, 179, 182, 208, 180, 163; 376/245, 246, 247, 249; 136/230, 232

(56) References Cited

U.S. PATENT DOCUMENTS

| | | | | |
|---|---|---|---|---|
| 2,785,216 A | * | 3/1957 | Winner, Jr. .................. 374/208 |
| 3,016,412 A | | 1/1962 | Ross | |
| 3,308,666 A | * | 3/1967 | Anderson et al. ............ 374/208 |
| 3,996,071 A | * | 12/1976 | Klicks et al. ................. 374/163 |
| 4,217,463 A | * | 8/1980 | Swearingen ................. 374/179 |
| 4,305,286 A | * | 12/1981 | Beuth et al. ................. 374/134 |
| 4,358,630 A | * | 11/1982 | Falk ............................ 374/139 |
| 4,377,347 A | * | 3/1983 | Hanmyo et al. ............. 374/139 |
| 4,444,990 A | * | 4/1984 | Villar ......................... 374/208 |
| 4,467,134 A | | 8/1984 | Pustell | |
| 4,548,517 A | * | 10/1985 | Kampmann ................. 374/138 |
| 4,673,300 A | * | 6/1987 | Wilhelmson et al. ........ 374/182 |
| 4,749,415 A | | 6/1988 | Barton | |
| 4,776,705 A | * | 10/1988 | Najjar et al. ................ 374/139 |
| 4,865,462 A | * | 9/1989 | Broomfield ................. 374/179 |
| 5,131,759 A | * | 7/1992 | Eiermann et al. ........... 374/139 |
| 5,193,912 A | * | 3/1993 | Saunders .................... 374/180 |
| 5,348,395 A | * | 9/1994 | Corr, II et al. .............. 374/179 |
| 5,366,290 A | * | 11/1994 | Mayer et al. ................ 374/139 |
| 5,427,452 A | * | 6/1995 | Stuart ......................... 374/179 |
| 5,662,418 A | * | 9/1997 | Deak et al. ................. 374/208 |
| 5,697,706 A | * | 12/1997 | Ciaravino et al. .......... 374/208 |
| 6,325,535 B1 | * | 12/2001 | Gibson et al. .............. 374/179 |

* cited by examiner

*Primary Examiner*—David Martin
*Assistant Examiner*—Jeanne-Marguerite Goodwin
(74) *Attorney, Agent, or Firm*—Keil & Weinkauf

(57) ABSTRACT

A probe for temperature measurement, comprising a probe, body which has a cylindrical hole into which a thermocouple or a resistance thermometer can be inserted, whose thermosensitive tip projects from the forward section of the probe body, the forward section of the probe body being provided with an annular gap at a small distance from the cylindrical hole.

10 Claims, 3 Drawing Sheets

TEMPERATURE MEASURING PROBE

BACKGROUND OF THE INVENTION

The present invention relates to a probe for temperature measurement, comprising a probe body which has a cylindrical hole into which a thermocouple can be inserted, whose thermosensitive tip projects from the forward section of the probe body.

Such probe bodies are known. As a rule they are cylindrical in shape and are conically tapered at the forward end. At the rear end they are provided with a thread by means of which they can be screwed into a mounting. Into the cylindrical hole a thermocouple of known design, preferably a miniature sheathed thermocouple is inserted. Such thermocouples normally comprise two cores of different metals which are embedded into an insulating material and are surrounded by a metallic shield, the sheath, the insulating material used being magnesium oxide or aluminum oxide, which have a high dielectric resistance. The sheath materials used as a rule are stainless steels. The thermocouple cores used are customarily NiCr—Ni wires which are welded together at the forward end. Above 1200° C., platinum-rhodium-platinum thermocouples are also used.

Thermoprobes containing thermocouples of this type are used for many purposes. Problems arise if they are used for temperature measurements in reactors and reactor tubes which are under high pressure and which require rapid temperature acquisition. The high pressure entails thick walls for the probe body, which must be of robust design. This results in a relatively sluggish change in temperature, which is transmitted to the tip of the thermocouple. Plants where such thermoprobes are used include, for example, high-pressure polyethylene plants in which the reaction is carried out by ethylene compression at operating pressures between 1500 and 3500 bar. In such a reactor, approximately 40 thermo-probes are employed whose purpose is to map the corresponding temperature profile, the probe bodies as a rule having a diameter of from 8 to 10 mm. The diameter of the thermocouples inserted into these is customarily approximately 2 mm.

SUMMARY OF THE INVENTION

U.S. Pat. No. 4,749,415 is discloses a thermocouple element for use in high-pressure, high temperature fluid applications having a cylindrical body portion formed from the first metal and a cap formed from a dissimilar metal. The cap is fused to the body such that the junction forms an axial thermocouple function. A plurality of grooves is formed in the cap and body to reduce the mass of material adjacent the unction for rapid conduction heat transfer from the fluid being monitored. The bottoms and the openings of the grooves are arranged parallel to the axis in lengthwise direction, such that the grooves extend in a radial direction towards the axis. This results in an increased surface submitted to the flow and therefor the conduction heat transfer is increased.

It is an object of the present invention to provide thermoprobes which can be used in reactors involving very high pressure and very high temperature, and a high flow velocity of the reactants and which nevertheless are able to detect rapid changes in temperature.

We have found that this object is achieved, according to the invention, by virtue of the forward section of the probe body being provided with an annular gap at a small distance from the cylindrical hole. Said annular gap has as low a thickness as possible, as a rule from 0.1 to 0.5 mm, preferably from 0.1 to 0.2 mm. The length of the annular gap is from 5 to 20 mm, preferably from 10 to 15 mm. The annular gap may have been produced by means of a laser beam. It may also be produced by virtue of the forward section of the probe body having at least one stepped reduction in the diameter, onto which reduction a cap has been fitted whose internal diameter in the forward section is greater than the forward section of the probe body, the annular gap being formed as a result. The cap may be welded to the probe body.

The probe according to the invention is particularly suitable for rapid temperature acquisition in plant sections where very high pressures, temperatures and flow velocities will occur. This is the case in chemical reactors, stirred vessels, tubular reactors, feeders to these apparatuses, and piping connections. Preferably, such probes can be used in polymerization reactors, both in the gas phase and in the supercritical medium, for example in the preparation of polyolefins. In the case of suspension polymerization in loop reactors these probes can likewise be employed advantageously.

In general this involves pressure ranges of from 30 to 5000 bar, preferably from 50 to 3500 bar, in particular from 1000 to 3500 bar, and temperatures of from 20 to 1000° C., preferably from 50 to 500° C., in particular from 100 to 400° C. The flow velocities are in the range from 1 to 50 m/s, preferably from 5 to 15 m/s.

The thermocouples used can be miniature sheathed thermocouples of various designs, preferably those made from NiCr—Ni wires, which are welded together at the forward end. Platinum-rhodium-platinum thermocouples and other known thermocouples can likewise be employed in this instance. Said wires of the thermocouple are embedded in an electrically nonconductive insulating material such as magnesium oxide or aluminum oxide and are surrounded by a metallic shield, the sheath. At the forward end the thermocouples are joined to the sheath by a metallic cap. Said cap must be insensitive with respect to the high temperatures, pressures and flow velocities arising. The cap is preferably hemispherical in shape.

As an alternative to the thermocouples, it is also possible to employ resistance thermometers or measuring shunts, platinum resistance thermometers and platinum measuring shunts being particularly advantageous, for example according to DIN IEC 751. These resistance thermometers comprise a measuring shunt, responsive to temperatures, in a protective cover, internal supply leads and external terminals for connection to electrical measuring instruments.

DETAILED DESCRIPTION OF THE INVENTION

Figure 1:
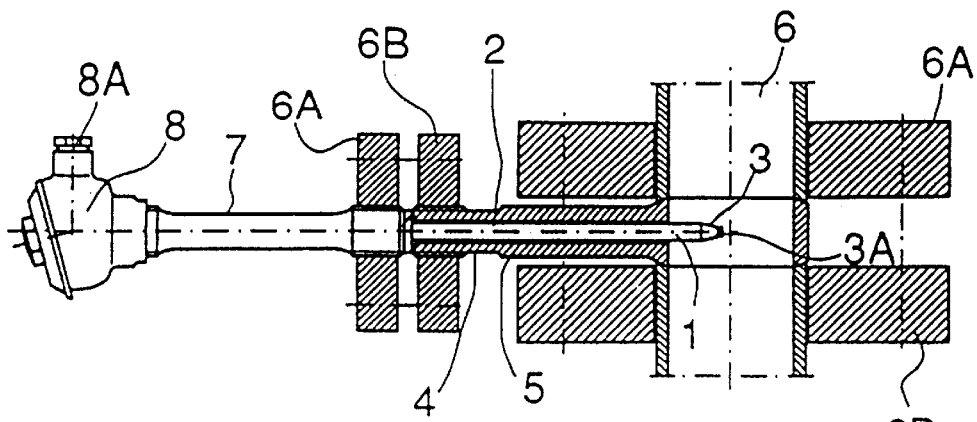
FIG. 1 shows a probe of known design, installed in a reactor tube, in section.

In the case of the embodiment shown in FIG. 1, a probe of known design is shown, which is installed in a tubular reactor. In the probe body 1 a cylindrical hole 2 is provided into which a sheathed thermocouple 3 has been inserted, which has a thermosensitive tip 3A. The probe body 1 is mounted in the cylindrical recess 4 of a connection piece 5 which is mounted in a pressure-tight manner between the flanges 6A and 6B of a reactor tube 6. In the reactor tube 6 it is possible, in the case of reactions, for example, involved in the production of polyethylene by ethylene compression, for operating pressures of from 500 to 5000 bar, preferably from 500 to 3500 bar to be produced. At the same time, large increases in temperature may occur, which can be in the range from 300 to 1000° C. The connection piece 5 is screwed, via flanges 6A and 6B, to the connection piece 7 of a connection head 8, from which electrical leads run via the connection section 8A to the display instruments.

Figure 2:
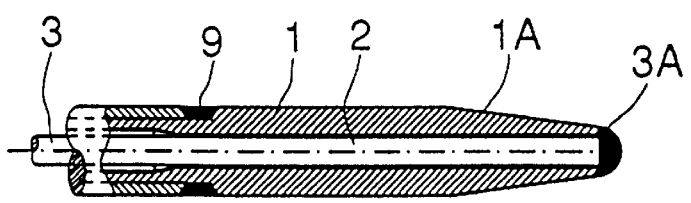
FIG. 2 shows an enlarged view of the forward section of the probe depicted in FIG. 1, in section.

The probe body 1 inserted into the connection piece 5 projects, with its forward end 1A, into the reactor tube 6. Its construction can be gathered from the illustrative embodiment depicted in FIG. 2. At its forward end the cylindrical probe body 1, which has an external diameter of 9 mm, has the shape of a truncated cone 1A, the angle formed with the central axis being 30°. The external diameter of the tip is 5 mm. A cylindrical hole 2 with a diameter of 2.2 mm runs centrally in the probe body 1. In this cylindrical hole a sheathed thermocouple 3 of type NiCr—Ni and having a tip 3A has been inserted. The probe body 1 is welded annularly to the connection piece 5 at a location 9.

The tip of the thermocouple 3A as a rule projects as far as the center of the gas flow so as to record the precise operating temperature. In the case of this known embodiment of the probe body according to FIG. 2, its thermal inertia results in a considerable delay in the display of the temperature obtaining at a given time.

Figure 3:
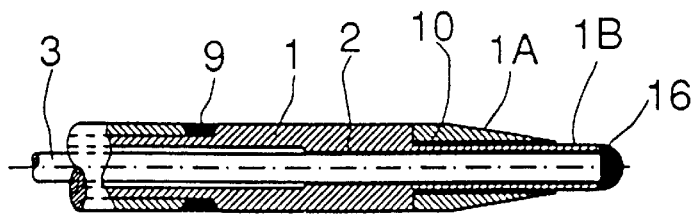
FIG. 3 shows a first embodiment of a probe according to the invention, in section.

FIG. 3 shows an embodiment of the probe body which, according to the invention, is provided at its forward end with an annular gap 10. This annular gap, in the case of a special embodiment, had a length of 15 mm and a gap width of 0.2 mm. The cylindrical hole 2 for the sheathed thermocouple 3 had a diameter of 1.5 mm, and the probe body's 1 cylindrical section 1B, situated inside the annular gap 10, had a diameter of 3.2 mm. In contrast to the embodiment according to FIG. 2, that section of the probe body 1, which was situated inside the annular gap, had been extended, at its tip opposite the end of the conical section 1A, by 2 mm by a cylindrical section 1B. The forward end of this section 1B was closed by a weld 16 whose outward shape was hemispherical. To ensure that the sheathed thermocouple 3 was mounted in a pressure-tight manner in the cylindrical hole 2, said cylindrical hole was densified after insertion of the sheathed thermocouple 3 by forging or rolling, which generally results in cold welding. The annular gap 10 was incised by means of a laser beam.

Figure 4:
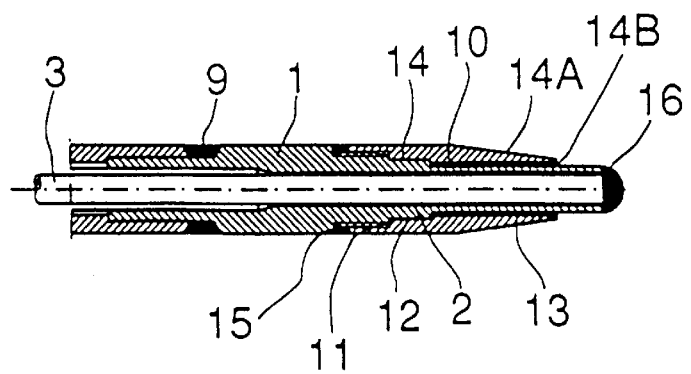
FIG. 4 shows a second embodiment of a probe according to the invention, in section.
Figure 3A:
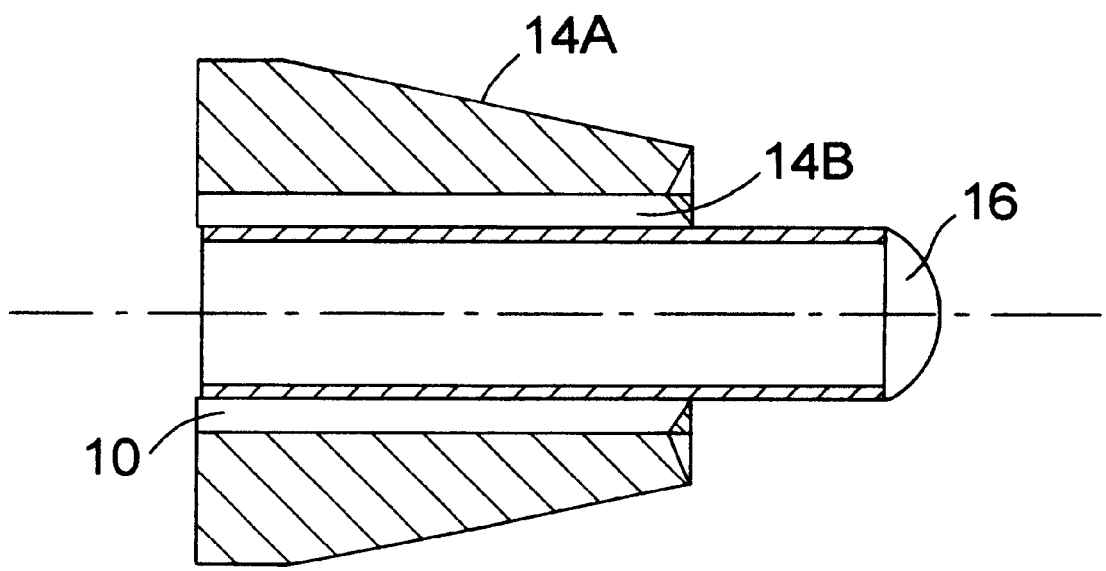
FIG. 3A shows a further enlarged portion of the embodiment of FIG. 3.

A further embodiment which can be fabricated particularly advantageously of the thermoprobe according to the invention is depicted in FIG. 4. There the probe body 1, which in the example shown has a diameter of 9 mm, is provided with a stepped shoulder 11 whose diameter is 7 mm and whose length is 20 mm. Then a further stepped shoulder 12 is provided for, whose diameter is 6 mm and whose length is 9 mm. Adjoining this shoulder is a shoulder 13 which runs as far as the tip and whose diameter is 3.2 mm. The cylindrical hole 2 has a diameter of 1.5 mm for a sheathed thermocouple having this diameter.

Onto this probe body 1 a cap 14 is fitted, whose external diameter equals the external diameter of the probe body 1, in this case therefore 9 mm. The inside of the cap 14 is provided with stepped recesses which correspond to the diameter of the steps 11, 12, 13 of the probe body 1. In the regions 11 and 12, the two parts mate precisely. In region 13 of the probe body 1, the diameter of the recess of the cap 14 is greater by 0.4 mm than the diameter of the probe body, the desired cylindrical gap 10 with a gap width of 0.2 mm being produced as a result. The forward section 13 of the probe body 1 projects 3 mm beyond the conical end 14A of the cap 14. The cap 14 is fastened to the probe body 1 via a weld 15. The forward section 14A of the cap 14 tapers conically and ends in an edge 14B which runs perpendicular to the longitudinal axis of the probe and has an external diameter of 5.2 mm. The forward end of the probe body 1 is closed by a welded-on cap 16.

In the case of very high flow velocities of the medium whose temperature is to be measured, a situation could arise where the tip, protruding from the cap 14, of the probe body 1 is bent out of shape and comes to lie against the forward section 14A of the cap 14. This would reduce the effect of the gap 10 according to the invention. This can be avoided, according to an advantageous development of the invention, by that edge 14B of the cap 14, which runs perpendicular to the axis of the probe, being provided, after installation, with a plurality of essentially conical beads, preferably three or four, which are parallel to the longitudinal axis of the probe and whose thickness is sufficient for their edges to result in contact with the probe body 1 in the region 14B. Admittedly, as a result, slightly increased heat conduction between the probe body 1 and the cap 14 takes place, but this is acceptable in view of the increased robustness of the probe according to the invention at high flow velocities of the medium to be measured.

Figure 5:
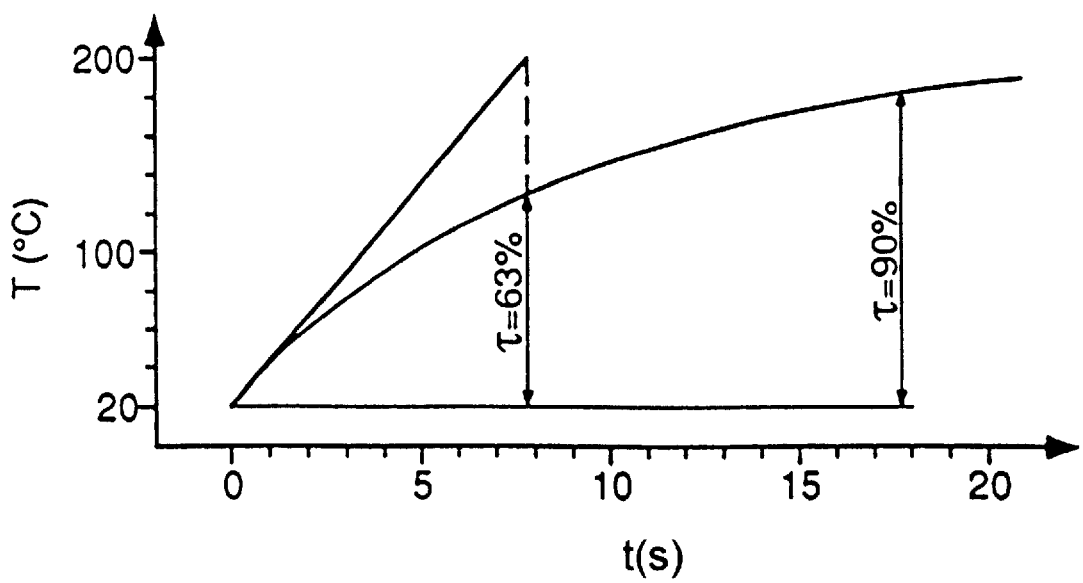
FIG. 5 shows a diagram of the temperature display, as a function of time, in the case of a known probe according to FIG. 2.

The temperature indication delay which occurs with a conventional probe, is depicted in FIG. 5. This involved the probe first being immersed into an oil bath of 20° C., to establish the initial value. Then the probe was immersed in an oil bath of 200° C. and the delay time was measured. From the curve shown in FIG. 5 it can be gathered that the time constant τ, which corresponds to 63% of the final value, was reached after 7.7 seconds. Not until 17.4 seconds was a temperature value of 90% of the final value reached.

Figure 6:
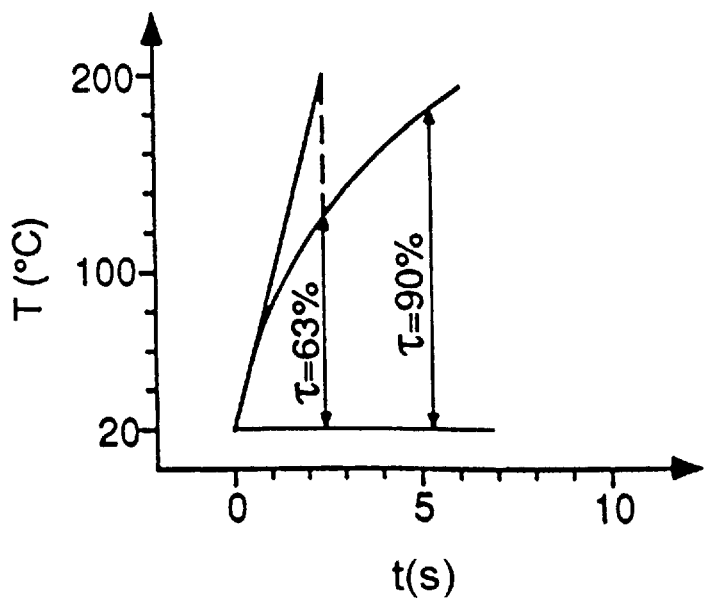
FIG. 6 shows a diagram of the temperature display, as a function of time, in the case of a probe according to FIG. 4.

The diagram depicted in FIG. 6 shows the results achieved with a probe of inventive design. Here the time constant τ was 2.45 seconds 90% of the final value was reached after as little as 5.1 seconds. The settling time, at which 95% of the final value is attained, is below 10 seconds with this embodiment.

The comparison of the two diagrams demonstrates the quite considerably more rapid detection of changes in temperature by the probe according to the invention, compared with conventional probes.

What is claimed is:

1. In a probe for temperature measurement during a reaction involving high temperature or high pressure or high incident flow velocity in a reactor (6), which probe comprises a probe body (1) having a forward section which is adapted for insertion into the reactor, the forward-most end of which body is in the shape of a truncated cone (1A) narrowing toward the forward-most end of the forward-most section said probe having a longitudinal cylindrical hole (2) through which passes a sheathed thermocouple (3), said thermocouple having a thermosensitive tip (3A) at the forward-most end of the probe, the improvement wherein, the forward-most end of the probe is provided with an annular gap (10), having a gap length of from 5 to 20 mm the thermosensitive tip of the sheathed (1B, 14B) thermocouple (3) extending beyond the forward-most end of the truncated cone.

2. The probe of claim 1, wherein the annular gap (10) has a gap width of from 0.1 to 0.5 mm.

3. The probe of claim 2, wherein the annular gap (10) has a gap width of from 0.1 to 0.2 mm.

4. The probe of claim 1, wherein the forward section of the probe body (1) has at least one stepped reduction (11) in diameter, and said section having a reduced diameter (11) is covered over by a cap (14) whose internal diameter is greater by the double value of the gap width of the annular gap (10).

5. The probe of claim 4, wherein the forward section of the probe body (1) has at least two steps (11, 13) having successively reduced diameter and wherein the cap (14) in its rear section has an internal diameter which corresponds to the first step (11) and by which it is fastened to the probe body (1).

6. The probe of claim 4, wherein the cap (14) is fixed, by means of a fit, to the probe body at a location (12) before the section having the most greatly reduced diameter (13).

7. The probe of claim 6, wherein the cap (14) at its rear section is welded (15) to the probe body (1).

8. The probe of claim 7, wherein the forward end of the cap (14) is deformed by a plurality of beads introduced parallel to the longitudinal axis of the probe body (1).

9. The probe of claim 1, wherein the forward end of the probe body (1) is closed by a welded-on cap (16).

10. A reactor (6) for conducting reactions at a pressure of 500 to 5,000 bar having at least one temperature measuring probe as defined in claim 1 wherein the most forward end of the probe extends into the reactor as far as to the center of the reactor.

* * * * *

UNITED STATES PATENT AND TRADEMARK OFFICE
CERTIFICATE OF CORRECTION

PATENT NO. : 6,543,934 B1
DATED : April 8, 2003
INVENTOR(S) : Hammer et al.

It is certified that error appears in the above-identified patent and that said Letters Patent is hereby corrected as shown below:

<u>Title page,</u>
Item [57], ABSTRACT,
Line 1, delete the comma at the end of the line.

Signed and Sealed this

First Day of July, 2003

JAMES E. ROGAN
*Director of the United States Patent and Trademark Office*